Patented July 15, 1941

2,249,545

UNITED STATES PATENT OFFICE 2,249,545

POLYVINYL ACETAL RESIN SHEETS CONTAINING A MIXTURE OF DIBUTYL SULPHONE AND DIBUTYL PHTHALATE

Donald R. Swan, Rochester, N. Y., assignor to Eastman Kodak Company, Rochester, N. Y., a corporation of New Jersey No Drawing. Application September 13, 1939, Serial No. 294,752

1 Claim. (Cl. 260—36)

This invention relates to polyvinyl acetal resin sheets, and more particularly to sheets suitable for the manufacture of safety glass.

One object of my invention is to produce compositions of matter which can be made into permanently transparent sheets suitable for use in laminated, shatter-proof glass. Another object is to produce compositions which can be rolled, extruded, molded, or otherwise worked into relatively thick sheets and massive plastics. Other objects will hereinafter appear.

I have discovered that a mixture of dibutyl sulphone and dibutyl phthalate is a useful plasticizer for polyvinyl acetal resins, such, for instance, as polyvinyl acetaldehyde acetal resins, polyvinyl formaldehyde acetal resins, and polyvinyl butyraldehyde acetal resins.

Neither dibutyl sulphone nor dibutyl phthalate is permanently compatible to the extent of 50 parts per 100 parts of polyvinyl acetaldehyde acetal resin in sheets or films. In the case of dibutyl sulphone, a part of it crystallizes out after a few days. In the case of dibutyl phthalate, a part of it exudes from the resin. However, I have discovered that when 40 or more parts of a mixture of from 30–70% of dibutyl sulphone with from 70–30% of dibutyl phthalate are used with 100 parts of polyvinyl acetaldehyde acetal resin, an unusual and remarkable effect is obtained which I may call "elasticizing." That is to say, a sheet of polyvinyl acetaldehyde acetal resin containing about 40 or more parts, per 100 parts of resin, of a mixture, of 30–70% dibutyl sulphone and 70–30% dibutyl phthalate is not only permanently transparent, but it posssesses the property which, in the rubber industry, is known as "nerve": namely, the property of stretching to a considerable extent when tension is exerted upon it, and returning to its original dimensions when the tension is released. This property renders such sheets, which I shall call "rubbery" sheets, particularly useful in the manufacture of shatter-proof glass.

Sheets for use in laminated glass may be made by dissolving the polyvinyl acetaldehyde acetal resin and the dibutyl sulphone and dibutyl phthalate in a suitable volatile solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. The solution is then cast as a sheet, the volatile solvent evaporated and the sheet stripped from the casting surface.

Sheets for use in laminated glass may also be made without the use of volatile solvent by extrusion, for example, in the manner set forth in application Serial No. 147,934 of John S. Kimble and Ernest C. Blackard, filed June 12, 1937. For example, 40 or more parts of a mixture of 30–70% dibutyl sulphone and 70–30% dibutyl phthalate, and 100 parts of a polyvinyl acetaldehyde acetal resin may be mixed in a suitable, jacketed mixer at a low temperature, for example 10° C., and the mixture may then be worked on hot rolls, in the manner described in U. S. Patent 2,048,686 of F. R. Conklin, until complete homogenization has taken place. The mass thus produced may then be extruded through an annular die, and the tube so formed slit to form a sheet.

The polyvinyl acetal resins can be prepared by reacting polyvinyl alcohol with an aldehyde in the presence of an acetal condensation catalyst, e. g. a mineral acid. These resins can also be prepared by simultaneously de-esterifying a polyvinyl aliphatic ester and reacting the de-esterification product with an aldehyde in the presence of a de-esterifying catalyst and acetal condensation catalyst. Mineral acids are catalysts for both de-esterification and acetal formation.

Examples of the preparation of polyvinyl acetaldehyde acetal resins may be found in U. S. Patent 2,044,730, Example 1; U. S. Patent 1,955,-068, Example 2; U. S. Patent 2,036,092, Examples 4, 5 and 6; British Patent 466,598, Examples 1, 2, 3, 4 and 7; British Patent 404,279, Examples 1, 2, 4, 5, 6, 7 and 8; U. S. Patent 1,990,399; and French Patent 808,578, Examples 1, 2 and 3.

An additional example of the preparation of a polyvinyl acetaldehyde acetal resin is as follows:

100 lbs. of polyvinyl acetate, the viscosity of whose molar solution in benzene was 45 centipoises, was dissolved in 300 lbs. of 95% ethyl alcohol. To this solution were added 30 lbs. of paraldehyde and 25 lbs. of 35% HCl. The reaction mixture was allowed to stand for 4 days at 40° C., after which it was diluted with ethyl alcohol, and the resin precipitated by pouring into cold water, washed and dried. Analysis showed the resin to have an acetate group content equivalent to 2.1% by weight of polyvinyl acetate and a hydroxyl group content equivalent to 12.9% by weight of polyvinyl alcohol.

What I claim as my invention and desire to be secured by Letters Patent of the United States is:

A transparent, rubbery sheet comprising 100 parts of a polyvinyl acetaldehyde acetal resin and, as an elasticizer therefor, at least 40 parts, approximately, of a mixture consisting of 30–70% of dibutyl sulphone and 70–30% of dibutyl phthalate.

DONALD R. SWAN.